United States Patent
Lee et al.

(10) Patent No.: US 10,788,456 B2
(45) Date of Patent: Sep. 29, 2020

(54) EDDY CURRENT INSPECTION DEVICE FOR NONDESTRUCTIVE TESTING

(71) Applicant: INDUSTRY-ACADEMIC COOPERATION FOUNDATION, CHOSUN UNIVERSITY, Gwangju (KR)

(72) Inventors: Jin Yi Lee, Gwangju (KR); Jung Min Kim, Gwangju (KR); Sun Bo Sim, Gwangju (KR)

(73) Assignee: Industry-Academic Cooperation Foundation, Chosun University, Gwangju (KR)

( * ) Notice: Subject to any disclaimer, the term of this patent is extended or adjusted under 35 U.S.C. 154(b) by 55 days.

(21) Appl. No.: 15/748,728

(22) PCT Filed: Nov. 28, 2017

(86) PCT No.: PCT/KR2017/013697
§ 371 (c)(1),
(2) Date: Jan. 24, 2019

(87) PCT Pub. No.: WO2019/017535
PCT Pub. Date: Jan. 24, 2019

(65) Prior Publication Data
US 2020/0049661 A1 Feb. 13, 2020

(30) Foreign Application Priority Data

Jul. 21, 2017 (KR) .................. 10-2017-0092885
Aug. 14, 2017 (KR) .................. 10-2017-0103060

(51) Int. Cl.
*G01N 27/90* (2006.01)
(52) U.S. Cl.
CPC ......... *G01N 27/904* (2013.01); *G01N 27/902* (2013.01); *G01N 27/9033* (2013.01)
(58) Field of Classification Search
None
See application file for complete search history.

(56) References Cited

U.S. PATENT DOCUMENTS 5,424,640 A * 6/1995 Levy ............... G01N 27/9046
324/232
9,182,373 B2 11/2015 Lee et al.
2011/0089937 A1 4/2011 Petrosy

FOREIGN PATENT DOCUMENTS

JP 05106658 A 4/1993
JP 10239282 A 9/1998
(Continued)

OTHER PUBLICATIONS

International Search Report for International Application No. PCT/KR2017/013697, dated Mar. 28, 2018, 2 pages.
(Continued)

*Primary Examiner* — Jas A Sanghera
(74) *Attorney, Agent, or Firm* — RatnerPrestia

(57) ABSTRACT

Disclosed is an eddy current inspection device for nondestructive testing. The device includes: a bobbin-shaped coil configured to be inserted into a specimen, which is an object of nondestructive testing, and to apply induction current to an inner diameter of the specimen; a reference coil configured to be inserted into a nondestructive specimen, which is a reference of the specimen, and to apply induction current to an inner diameter of the nondestructive specimen; a cylindrical manual sensor array configured to disposed in the bobbin-shaped coil and to include lines and rows; and a control module configured to select one or more frequencies of multiple frequencies, apply AC power to the bobbin-shaped coil and the reference coil, generate a square wave signal with a varying phase difference, and perform first multiplication by an applied signal and the square wave signal. Accordingly, it is possible to accurately detect a flaw.

8 Claims, 8 Drawing Sheets

(56) References Cited

FOREIGN PATENT DOCUMENTS

| | | |
|---|---|---|
| JP | 2006145295 A | 6/2006 |
| JP | 2006145296 A | 6/2006 |
| KR | 1020120065243 A | 6/2012 |
| KR | 1020130130529 A | 12/2013 |

OTHER PUBLICATIONS

Korean Notification of Reason for Refusal for Korean Application No. 10-2017-0092885, dated Sep. 16, 2018 with translation, 11 pages.
Korean Notification of Reason for Refusal for Korean Application No. 10-2017-0103060, dated Oct. 8, 2018 with translation, 15 pages.
Korean Notification of Reason for Refusal for Korean Application No. 10-2017-0103060, dated Mar. 18, 2019 with translation, 6 pages.

* cited by examiner

FIG. 7
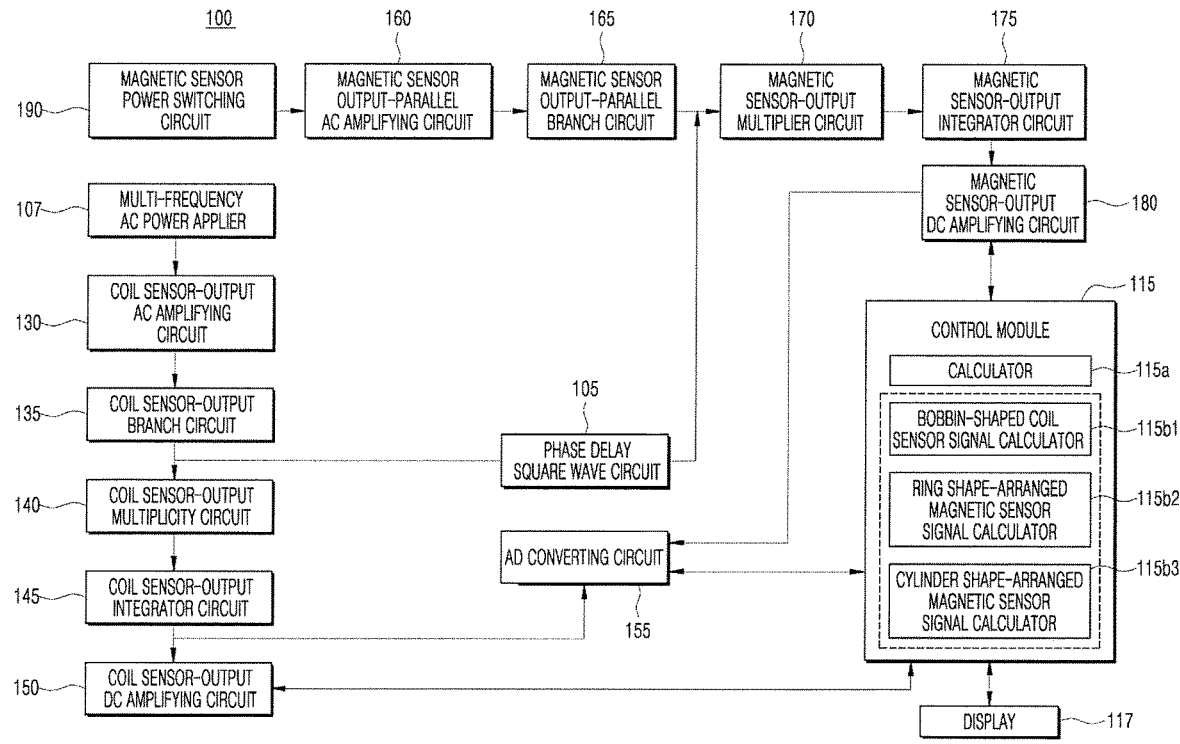
FIG. 8A
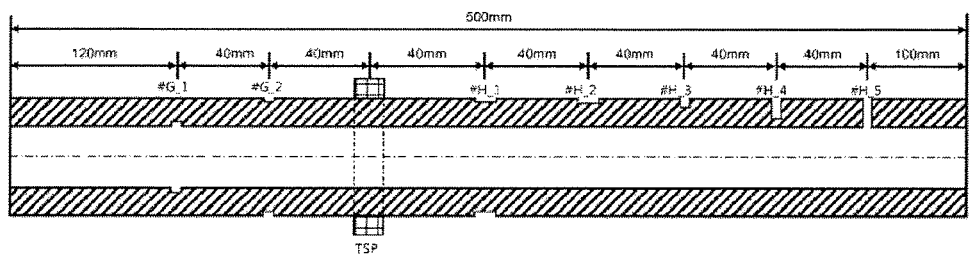
FIG. 8B
| Location | #G_1 | #G_2 | TSP | #H_1 | #H_2 | #H_3 | #H_4 | #H_5 |
|---|---|---|---|---|---|---|---|---|
| Flaw Depth | 0.127 | 0.254 | | 0.254 | 0.508 | 0.762 | 1.016 | Hole |
| Flaw % of Wall | 10% | 20% | N/A | 20% | 40% | 60% | 80% | 100% |
| Flaw Width/Dia | 1.588 | 3.175 | 15.875/40.00 | 4.763 | 4.763 | 2.778 | 1.984 | 1.321 |
| Flaw Type | ID Groove | OD Groove | TSP | FBH | FBH | FBH | FBH | TWH |

EDDY CURRENT INSPECTION DEVICE FOR NONDESTRUCTIVE TESTING

CROSS REFERENCE TO RELATED APPLICATIONS

This application is the U.S. National Phase Application of PCT/KR2017/013697, filed Nov. 28, 2017, which claims priority to Korean Patent Applications 10-2017-0092885, filed Jul. 21, 2017 and 10-2017-0103060, filed Aug. 14, 2017, the contents of such applications being incorporated by reference herein.

BACKGROUND OF THE INVENTION

1. Field of the Invention

The present disclosure relates to an eddy current inspection device for nondestructive testing.

2. Description of the Prior Art

A heat exchanger of a power plant performs heating, cooling, condensing, etc. by exchanging heat of fluid through a heat transfer surface of a heat transfer tube. A heat exchanger used for a long period of time under an environment with high temperature, high pressure, vibration, and water chemistry factors may suffer damage such as corrosion, pitting, erosion, wearing, wall thinning, fatigue cracking, SCC (stress corrosion cracking), and IASCC (irradiation assisted stress corrosion cracking). When the heat exchanger cannot perform the essential functions due to these damages, it may cause inconvenience in the normal operation of the power plant. Accordingly, nondestructive testing for checking safety of the heat transfer pipe of a heat exchanger is periodically performed in the process of designing, using, and maintaining a power plant. To this end, a probe for eddy current inspection may be inserted into the heat transfer pipe to perform nondestructive testing.

A bobbin-shaped probe, a ring-shaped probe, a rotary probe, etc. have been for nondestructive testing the related art. However, there is a demand for a nondestructive testing device that has improved testing speed, flaw detection ability, and durability and performs quantitative evaluation.

SUMMARY OF THE INVENTION

The present disclosure has been made in an effort to solve the above problems and an aspect of the present disclosure is to provide an eddy current inspection device that measures in real time amplitude and phase difference distribution of eddy current.

The technical subjects pursued in the present disclosure may not be limited to the above mentioned technical subjects, and other technical subjects which are not mentioned may be clearly understood, through the following descriptions, by those skilled in the art of the present disclosure.

In accordance with an aspect of the present disclosure, an eddy current inspection device for nondestructive testing according to an embodiment of the present disclosure includes: a bobbin-shaped coil configured to be inserted into a specimen, which is an object of nondestructive testing, and to apply induction current to an inner diameter of the specimen; a reference coil configured to be inserted into a nondestructive specimen, which is a reference of the specimen, and to apply induction current to an inner diameter of the nondestructive specimen; a cylindrical manual sensor array configured to disposed in the bobbin-shaped coil and to include lines and rows; and a control module configured to select one or more frequencies of multiple frequencies, apply AC power to the bobbin-shaped coil and the reference coil, generate a square wave signal with a varying phase difference, and perform first multiplication by an applied signal and the square wave signal, in which the control module is configured to switch and apply driving power such that arc-directional rows are sequentially selected from a plurality of rows of the cylindrical manual sensor array, and to perform second multiplication of multiplying the applied signal by the square wave signal with a varying phase frequency, and configured to detect a flaw of the specimen on the basis of the first multiplied signal and the second multiplied signal, using amplitude and phase difference distribution of a signal.

An eddy current inspection device for nondestructive testing according to another embodiment of the present disclosure includes: a bobbin-shaped coil configured to be inserted into a specimen, which is an object of nondestructive testing, and to apply induction current to an inner diameter of the specimen; a cylindrical manual sensor array configured to disposed in the bobbin-shaped coil and to include lines and rows; and a control module configured to select one or more frequencies of multiple frequencies, apply AC power to the bobbin-shaped coil, generate a square wave signal with a varying phase difference, and perform first multiplication by an applied signal and the square wave signal, in which the control module is configured to switch and apply driving power such that arc-directional rows are sequentially selected from a plurality of rows of the cylindrical manual sensor array, and to perform second multiplication of multiplying the applied signal by the square wave signal with a varying phase frequency, and configured to detect a flaw of the specimen on the basis of the first multiplied signal and the second multiplied signal, using amplitude and phase difference distribution of a signal.

An eddy current inspection device for nondestructive testing according to another embodiment of the present disclosure includes: a bobbin-shaped coil configured to be inserted into a specimen, which is an object of nondestructive testing, and to apply induction current to an inner diameter of the specimen; a reference coil configured to be inserted into a nondestructive specimen, which is a reference of the specimen, and to apply induction current to an inner diameter of the nondestructive specimen; a ring-shaped manual sensor array configured to disposed in the bobbin-shaped coil and to include one row; and a control module configured to select one or more frequencies of multiple frequencies, apply AC power to the bobbin-shaped coil and the reference coil, generate a square wave signal with a varying phase difference, and perform first multiplication by an applied signal and the square wave signal, in which the control module is configured to apply driving power to the ring-shaped manual sensor array and to perform second multiplication of multiplying the applied signal by the square wave signal with a varying phase frequency, and configured to detect a flaw of the specimen on the basis of the first multiplied signal and the second multiplied signal, using amplitude and phase difference distribution of a signal.

The eddy current inspection device may further include an encoder system, which may include: a support configured to be temporarily inserted in a tube close to the specimen that is an object of nondestructive testing; a brake configured to control a movement speed of a probe of the eddy current inspection device when the probe is inserted into or drawn out of the specimen and a predetermined condition is satisfied; and an encoder configured to output a signal corresponding to the location of the probe in the specimen when the probe is inserted into or drawn out of the specimen.

The encoder system may be configured to reduce the movement speed of the probe through the brake when the probe is inserted into or drawn out of the specimen at a speed higher than a predetermined speed.

The phase difference of the square wave signal with a varying phase difference may be 90 degrees.

The eddy current inspection device may further include a display, in which the control module may be configured to quantitatively display amplitude and a phase difference of the signal for each flaw on the display on the basis of one or more selected frequencies.

The control module may be configured to activate a circuit configured to determine an amplification ratio of an AC amplifying circuit and a DC amplifying circuit, switch and apply driving power to the lines and rows of the cylindrical manual sensor array, and convert an analog signal into a digital signal.

According to various embodiment of the present disclosure, the following effects can be achieved.

First, since a rotary structure is not used, it is possible provide to an eddy current inspection device having a simple structure and high mechanical durability.

Further, since the eddy current inspection device is provided, it is possible to visually show in real time amplitude and phase difference distribution of eddy current, which was not achieved by equipment of the related art.

Further, since the eddy current inspection device is provided, it is possible to achieve the advantages of all of a bobbin-shaped probe, a rotary probe, and a ring shape-arranged probe.

Further, since the eddy current inspection device is provided, it is possible to automatically detect a flaw of a heat transfer tube of a small-diameter heat exchanger.

Further, since the eddy current inspection device is provided, it is possible to automatically evaluate the location, shape, size etc. of a flaw.

Further, since the eddy current inspection device is provided, it is possible to quantitatively measure distortion distribution of an electromagnetic field caused by existence of a flaw and discriminate and quantitatively evaluate corrosion, wear, and cracks, as compared with a bobbin-shaped eddy current probe of the related art.

Further, since the eddy current inspection device is provided, even though there is no rotary member, it is possible to quantitatively and quickly measure distortion distribution of an electromagnetic field caused by existence of a flaw, discriminate and quantitatively evaluate corrosion, wear, and cracks, and provide high durability, as compared with a rotary eddy current probe of the related art.

Further, since the eddy current inspection device is provided, it is possible to increase space resolution while generating a small amount of heat, quickly measure distortion distribution of an electromagnetic field, and easily discriminate and quantitatively evaluate corrosion, wear, and cracks, as compared with a ring shape-arranged eddy current probe of the related art.

Further, since the eddy current inspection device is provided, it is possible to quantitatively evaluate whether a flaw is inside or outside, quantitatively and quickly measure distortion distribution of an electromagnetic field even without the device operating in the axial direction, and easily discriminate and quantitatively evaluate corrosion, wear, and cracks, as compared with a ring shape-arranged magnetic sensor probe of the related art.

Finally, since the eddy current inspection device is provided, it is possible to quantitatively evaluate whether a flaw is inside or outside, quantitatively measure distortion distribution of an electromagnetic field according to a frequency, and easily discriminate and quantitatively evaluate corrosion, wear, and cracks, as compared with a cylinder shape-arranged magnetic sensor probe of the related art.

Effects obtainable from the present disclosure may not be limited to the above mentioned effects, and other effects which are not mentioned may be clearly understood, through the following descriptions, by those skilled in the art of the present disclosure

BRIEF DESCRIPTION OF THE DRAWINGS

The above and other aspects, features and advantages of the present disclosure will be more apparent from the following detailed description taken in conjunction with the accompanying drawings, in which:

FIG. 7 is a block diagram showing the configuration of an eddy current inspection device according to an embodiment of the present disclosure;

FIGS. 8A and 8B are views showing a specimen with various flaws according to an embodiment of the present disclosure;

Although the present disclosure was described above with reference to specific embodiments, the present disclosure is not limited to the embodiments and may be changed and modified in various ways by those skilled in the art without departing from the scope of the present disclosure.

DETAILED DESCRIPTION OF THE EXEMPLARY EMBODIMENTS

Various embodiments of the present disclosure are described hereafter with reference to the accompanying drawings. However, in describing the present disclosure, detailed descriptions of well-known functions or configurations relating to the present disclosure will not be provided so as not to obscure the description of the present disclosure with unnecessary details.

Figure 1:
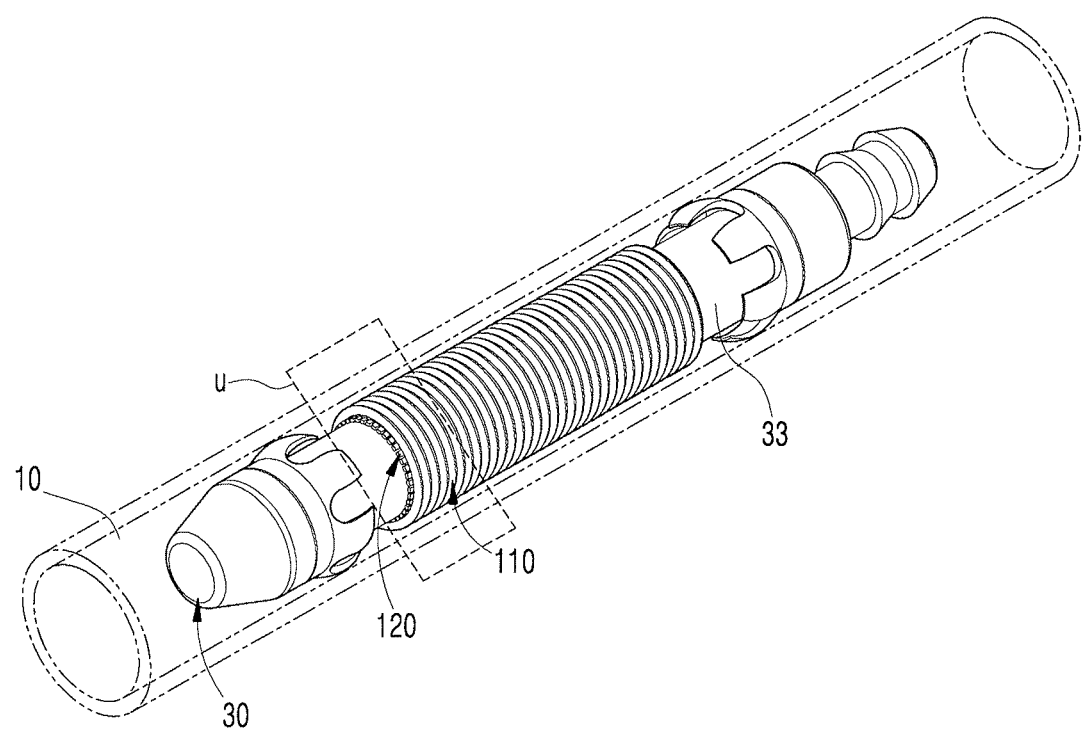
FIG. 1 is a view showing a probe of an eddy current inspection device inserted in a specimen according to an embodiment of the present disclosure.

FIG. 1 shows an example, in which is a probe 30 of an eddy inspection device 100 (see FIG. 7) of the present disclosure is inserted in a specimen 10. The reference numerals shown in FIG. 7 are used in the following description.

Nondestructive testing can detect flaws such as pores or cracks in the specimen 10 without destructing the specimen 10, using an ultrasonic wave and eddy current. Eddy current is induction current generated by an AC magnetic field that is applied to the surface of a conductor and an eddy current inspection device is a device that performs nondestructive testing by measuring eddy current induced eddy current in the specimen 10. Further, the probe 30 is a search unit for performing nondestructive testing.

A heat transfer tube that transmits heat of fluid used for a heat exchange of a nuclear power plant is exemplified as the specimen in the present disclosure, but various objects that are objects of nondestructive testing can be used as the specimen 10, depending on embodiments.

The probe 30 may be formed in a cylindrical shape and may include a probe body 33, a bobbin-shaped coil 110 wound around the probe body 33, and a cylindrical hall sensor array 120 disposed in the bobbin-shaped coil 110. The probe body 33 may be formed in various shapes. If there is an obstacle when the probe 30 is inserted into the specimen 10, the probe 30 can detect the object and inform a control module 115 (see FIG. 7) of the obstacle.

Figure 2:
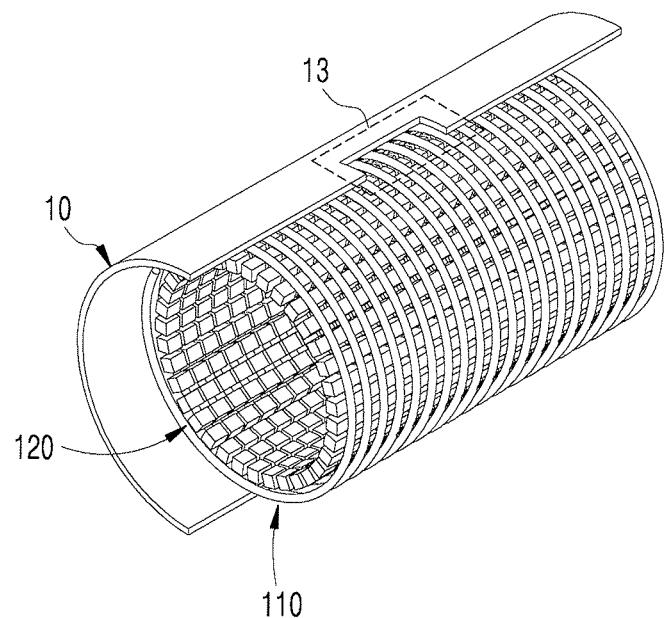
FIG. 2 is an enlarged view showing in detail a portion of the probe shown in FIG. 1.

Detailed description referring to FIG. 2 enlarging a specific portion (u) of the probe 30 shown in FIG. 1 is provided hereafter.

Referring to FIG. 2, the specimen 10 may include a flaw portion 13. The flaw portion 13 may be generated by corrosion, wear, cracks etc. and may be generated by a volumetric flaw.

The eddy current inspection device 100 is proposed to accurately detect the detective portion 13 and can accurately detect the flaw portion 13, using the bobbin-shaped coil 110 and the cylindrical hall sensor array 120.

The bobbin-shaped coil 110, which is a wide bobbin-shaped coil having a radius r, can be inserted into the specimen 10 that is made of metal in a pipe shape and has a small diameter. Although it is exemplified that the specimen 10 has a small diameter, it may have a large or medium-size diameter, depending on embodiments.

AC voltage expressed as in the following Equation 1 can be applied to the bobbin-shaped coil 110.

$$V(t) = V_0 \sin \omega t \quad \text{[Equation 1]}$$

where a frequency can be obtained from an equation $\omega = 2\pi f$ and the eddy current inspection device 100 (see FIG. 7) can apply AC voltage with multiple frequencies to the bobbin-shaped coil 110. For example, the eddy current inspection device 100 can apply a frequency of 30 kHz or 50 Hz or a combination of these frequencies to the bobbin-shaped oil 110, but the present disclosure is not limited thereto. A specific circuit that applies multi-frequency AC power may be included to apply multiple frequencies. When multiple frequencies are applied, the accuracy of detecting a flaw can be increased.

When AC voltage is applied to the bobbin-shaped coil 110, flow of induction current may be shown at the inner diameter of the specimen 10. When the radial direction is r, the arc direction is Φ, the axial direction is z, and the resistance and inductance of the bobbin-shaped coil 110 are respectively R and L in a cylindrical coordinate system, exciting current can be obtained as in the following Equation 2. Further, the exciting current of the bobbin-shaped coil 110 generates magnetic flux in the z-axial direction as in Equation 3.

$$i_{ext}(t) = \frac{V_0}{\sqrt{R^2 + (\omega L)^2}} \sin\left(\omega t - \tan^{-1}\frac{\omega L}{R}\right) \quad \text{[Equation 2]}$$

$$\Psi_1 = \mu \pi b^2 i_{ext}(t) \quad \text{[Equation 3]}$$

Without a flaw in the specimen 10, induction current of Equation 4 is generated in the Φ direction of the specimen 10, opposite to the bobbin-shaped coil 110. Further, the induction current generates magnetic flux in the −z direction as in Equation 5. d is the thickness of the specimen 10 in Equation 5.

$$i_{specimen}(t) = \frac{V_0}{\sqrt{R_s^2 + (\omega L_s)^2}} \sin\left(\omega t - \tan^{-1}\frac{\omega L_s}{R_s}\right) \quad \text{[Equation 4]}$$

$$\Psi_{2,specimen} = \mu\pi\left(b + \frac{d}{2}\right)^2 i_{specimen}(t) \quad \text{[Equation 5]}$$

Accordingly, magnetic flux of Equation 6 can be applied to the bobbin-shaped coil 110.

$$\Psi_{specimen} = \Psi_1 - \Psi_{2,specimen} \quad \text{[Equation 6]}$$

Meanwhile, the cylindrical hall sensor array 120 may be disposed in the bobbin-shaped coil 110. A plurality of hall sensors may be arranged in rows and columns in a cylindrical shape. Further, when the entire length of the sensors has to be short due to bending of the heat transfer pipe of a heat exchanger, the sensors may be arranged in one row in a ring shape. The cylindrical hall sensor 120 is fixed without rotating, so the durability of the eddy current inspection device is improved.

When induction current is distorted in the specimen 10, a magnetic field that changes with time (time varying magnetic field) is also distorted. The hall sensors are semiconductor-based manual magnetic sensors arranged in a ring or cylinder shape and can measure distortion of a time varying magnetic field. Accordingly, the hall sensors can measure not only flaws of the specimen 10, but the intensity of a time varying magnetic field. Accordingly, the size is smaller and there is no interference among the sensors, as compared with using active coil sensors, so space resolution is high and there is no need for alternately activating sensors. Further, the hall sensors may be replaced by GMR (Giant MagnetoResistance) sensors, depending on embodiments.

Figure 3:
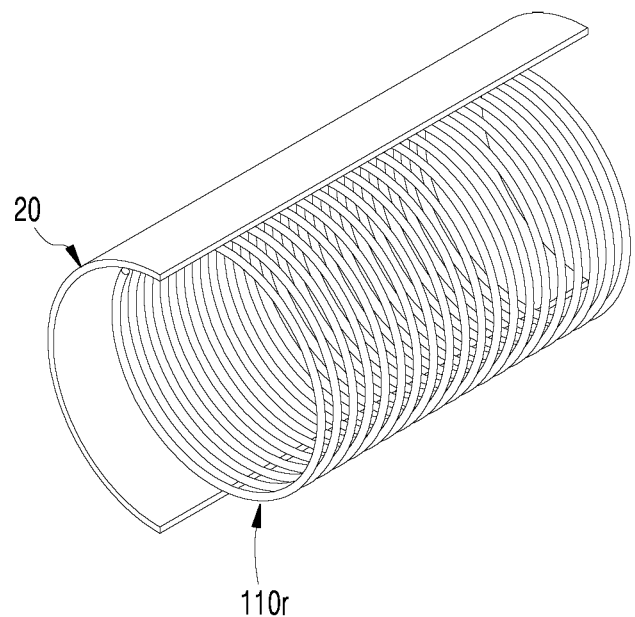
FIG. 3 is a view showing a reference coil corresponding to a bobbin-shaped coil shown in FIG. 2.

FIG. 3 shows a reference coil 110r corresponding to the bobbin-shaped coil 110 shown in FIG. 2.

The specimen 20 shown in FIG. 3 is a non-flaw specimen 20. The non-flaw specimen 20 is made of the same material as the specimen 10 and is a reference of the specimen 10, and is characterized in that there is no flaw. The reference coil 110r may be disposed in the non-flaw specimen 20. Magnetic flux expressed in the following Equation 7 may be applied to the reference coil 110r.

$$\Psi_{reference} = \Psi_1 - \Psi_{2,reference} \quad \text{[Equation 7]}$$

Figure 4:
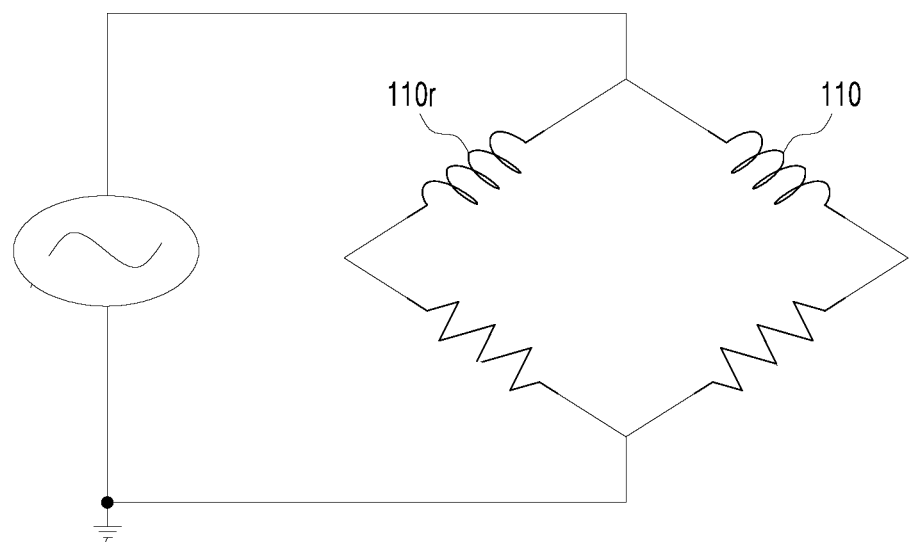
FIG. 4 is a view showing a multi-frequency AC power circuit according to an embodiment of the present disclosure.

FIG. 4 is a view showing a multi-frequency AC power circuit according to an embodiment of the present disclosure.

As in FIG. 4, the outputs of the bobbin-shaped coil 110 inserted in the specimen 10 and the reference coil 110r inserted in the non-flaw specimen 20 can be differentially connected. In detail, the bobbin-shaped coil 110 may be disposed at an end of a bridge circuit of a multi-frequency AC power applier 107, the reference coil 110r may be disposed at the other end, and two resistors may be disposed at each of the ends.

The multi-frequency AC power applier 107 may be controlled to receive AC power of a frequency selected from a plurality of frequencies by a control module 115 to be described below. When the outputs of the bobbin-shaped coil 110 and the reference coil 110r are differentially connected, output signals can be expressed as in Equation 8 using Equations 6 and 7. The term "reference" means the reference coil 110r and "specimen" means the bobbin-shaped coil 110 in Equation 8.

$$\Psi = \Psi_{2,reference} - \Psi_{2,specimen} \qquad \text{[Equation 8]}$$

If there is no flaw in the specimen 10, output current by $\Psi$ in Equation 8 is 0. However, when there is a flaw in the specimen 10, $\Psi$ is not 0, and impedance and a phase difference expressed as in Equations 9 and 10 are changed in accordance with the location and size of the flaw.

$$Z = \sqrt{R_C^2 + (\omega L_C)^2} \qquad \text{[Equation 9]}$$

$$\theta = \tan^{-1} \frac{\omega L_C}{R_C} \qquad \text{[Equation 10]}$$

For convenience, the current that is output when there is a flaw can be obtained as in the following Equation 11 using Equations 9 and 10. The term "crack" means a flaw in Equation 11.

$$i_{crack}(t) = \frac{V_0}{Z} \sin(\omega t - \theta) \qquad \text{[Equation 11]}$$

Figure 5:
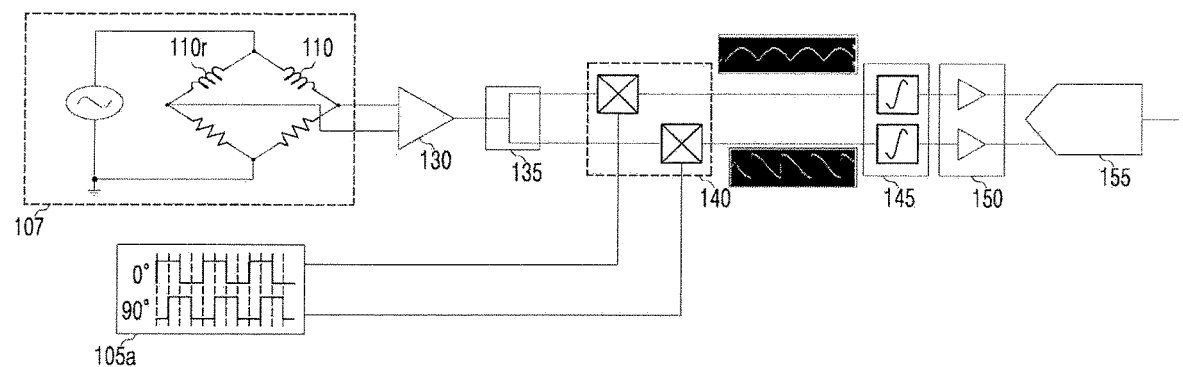
FIG. 5 is a view showing a circuit for obtaining the signal of eddy current using the bobbin-shaped coil and the reference coil according to an embodiment of the present disclosure.

FIG. 5 is a view showing a circuit for obtaining the signal of eddy current using the bobbin-shaped coil 110 and the reference coil 110r according to an embodiment of the present disclosure. However, the reference coil 110r may be removed from the circuit and the non-detective specimen 20 may also be removed, depending on embodiments.

The eddy current inspection device 100 can obtain a sufficiently amplified signal level by connecting the differential signal lines of the bobbin-shaped coil 110 and the reference coil 110r to a coil sensor-output AC amplifying circuit 130. The eddy current inspection device 100 can divide the amplified signal level using a coil sensor-output branch circuit 135. Further, when the eddy current inspection device 100 performs multiplication of the branch signals and a signal 105a of a phase delay square wave circuit 105 using a coil sensor-output multiplicity circuit 140, the following Equations 12 and 13 can be obtained from Equation 11. The phase delay square wave circuit 105 can provide signals having a phase difference of 90 degrees to the coil sensor-output multiplicity circuit 140.

$$V_1(t) = \frac{V_0}{Z} \sin(\omega t - \theta) \qquad \text{[Equation 12]}$$

$$V_2(t) = \frac{V_0}{Z} \cos(\omega t - \theta) \qquad \text{[Equaion 13]}$$

The eddy current inspection device 100 can integrate the multiplied signals using a coil sensor-output integrator circuit 145. The eddy current inspection device 100 can express a signal into a real number part and an imaginary number part in a complex plane when performing signal calculation on the bobbin-shaped coil 110 using a control module 115.

That is, by respectively squaring and adding the sides of Equations 12 and 13 to each other and then extracting squares, the impedance difference as in the following Equation 14 can be obtained. When there is a flaw in the specimen 10, the impedance of induction current is increased.

$$\sqrt{V_1^2 + V_2^2} = \frac{V_0}{Z} \qquad \text{[Equation 14]}$$

Further, by performing division, the phase difference as in the following Equation 15 can be obtained. It is possible to determine whether there is a flaw on the inner diameter (ID) or the outer diameter (OD) of the specimen 10, using the phase difference.

$$\frac{V_1}{V_2} = \tan(\omega t - \theta) \qquad \text{[Equation 15]}$$

As described above, the eddy current inspection device 100 can determine where a flaw is on the specimen 10 on the basis of the impedance difference and the phase difference.

Figure 6:
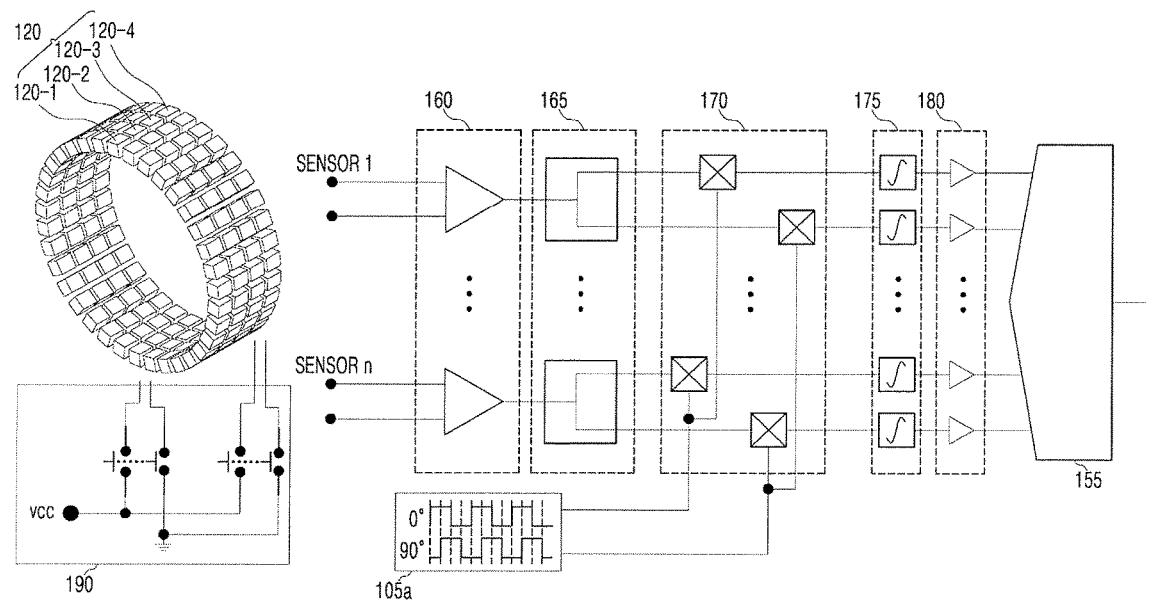
FIG. 6 is a view showing a circuit for obtaining the signal of eddy current using a cylindrical hall sensor array according to an embodiment of the present disclosure.

On the other hand, FIG. 6 is a view showing a circuit for obtaining the signal of eddy current using a cylindrical hall sensor array 120 according to an embodiment of the present disclosure;

The eddy current inspection device 100 can obtain a signal using the cylindrical hall sensor array 120. According to the eddy current inspection device, when the wide bobbin-shaped coil 110 having a radius 'r' is inserted in the metallic pipe-shaped small-diameter specimen 10 and AC voltage with a frequency obtained from $\omega = 2\pi f$ is applied, the induction current generated on the inner diameter of the specimen is distorted around a flaw. Accordingly, an r-directional alternating magnetic field is generated with a z-directional alternating magnetic field. The alternating magnetic field means a magnetic field of which the intensity is changed in a positive or negative direction with time, without the direction changed.

In order to measure the alternating magnetic field, the eddy current inspection device 100 supplies power to one row (each of 120-1 to 120-4) in the $\Phi$ direction of the cylindrical hall sensor array 120 by activating a magnetic sensor power switching circuit 190. The cylindrical hall sensor array 120 may have more rows than the four rows 120-1 to 120-4 shown in FIG. 6, and it may be formed in a ring shape with one row when there is a need to reduce the entire length of sensors.

Further, the eddy current inspection device 100 can obtain a sufficiently amplified signal level and then divide the signal using the magnetic sensor output-parallel branch circuit 165 by connecting the signal lines of the z-directional sensor arrays to a magnetic sensor output-parallel AC amplifying circuit 160.

Further, the eddy current inspection device 100 can multiply the branch signals into a square wave signal 105a of the square wave circuit 105 and a branch signal, using a magnetic sensor-output multiplier circuit 170. Accordingly, the eddy current inspection device 100 can measure the amplitude and phase difference of the r-direction alternating magnetic field caused by a flaw, as in Equations 12 to 15. The amplitude and phase difference can be calculated in terms of software by a ring shape-arranged magnetic sensor signal calculator 115b2, and may be calculated in terms of hardware, depending on embodiments.

According to FIG. 6, it is possible to evaluate that a flaw of the specimen 10 is a volumetric flaw or a cracking flaw, so the danger of leakage due to breaking of a heat transfer pipe in normal output operation of a power plant can be removed. Further, even if the cylindrical hall sensor array 120 is inserted and stopped, it is possible to measure distribution of a time varying magnetic field without mechanical rotation, so deterioration of the equipment can be prevented. Further, detection and evaluation of a flaw can be quickly performed by electronic scan. Further, since the cylindrical hall sensor array 120 has a plurality of rows and the rows are formed in ring shapes, it is possible to quickly determine whether there is a flaw and perform quantitative evaluation by selecting and axially scanning only one row. Further, since the hall sensors are not active coil sensors and are small in size, there is no problem of interference among the sensors, the manufacturing cost can be reduced, and the space resolution is high. Further, it is possible to scan only some area of the specimen 10 in the axial direction, and when the time varying magnetic field is distorted by a flaw, existence or not, the shape, and the size of a flaw can be quantitatively accurately evaluated. Further, since it is possible to detect a flaw using multiple frequencies, an excellent effect can be expected in quantitative evaluation of a flaw.

FIG. 7 to be referred hereafter is a block diagram showing the configuration of the eddy current inspection device 100 according to an embodiment of the present disclosure. The eddy current inspection device 100 can provide both of flaw detection based on sensing that uses the coils 110 and 110r and flaw detection using the cylindrical hall sensor array 120.

Sensing that uses the coils 110 and 110r is described first.

The eddy current inspection device 100 may include the multi-frequency AC power applier 107 that applies multiple frequencies. The control module 115 of the eddy current inspection device 100 can perform controlling such that a plurality of frequencies can be applied to the multi-frequency AC power applier 107.

The eddy current inspection device 100 can multiple the applied alternating current by the signals output from the coil sensor-output AC amplifying circuit 130 and the coil sensor-output branch circuit 135 and the square wave signal having a phase difference of 90 degrees in the phase delay square wave circuit 105, using the coil sensor-output multiplicity circuit 140.

The multiplied signals can be converted into digital signals from analog signals by an AD converting circuit 155 through the coil sensor-output integrator circuit 145 and a coil sensor-output DC amplifying circuit 150.

A bobbin-shaped coil sensor signal calculator 115b1 of the control module 115 can calculate an amplitude and a phase difference according to existence or not and the location of a flaw by combining two signals output from the coil sensor-output DC amplifying circuit 150.

Next, flaw detection using the cylindrical hall sensor 120 is described, following the sensing that uses the coils 110 and 110r.

First, the eddy current inspection device 100 can sequentially axially apply power through the magnetic sensor power switching circuit 190 that selectively applies power to the rows 120-1, 120-2, 120-3, and 120-4 of the cylindrical hall sensor array 120. The present disclosure is not limited only to the axial direction, power may be sequentially applied ahead of and behind portions with a flaw, depending on embodiments.

The eddy current inspection device 100 can control the applied signals to be output through the magnetic sensor output-parallel AC amplifying circuit 160 and the magnetic sensor output-parallel branch circuit 165.

The signal output from the branch circuit 165 can be multiplied by the square wave signal of the phase delay square wave circuit 105 through the magnetic sensor-output multiplier circuit 170. The square wave signal may be the square wave signal used by the coil sensors 110 and 110r and has a phase difference of 90 degrees, but it may have other phase differences, depending on embodiments. Only necessary signals can be easily extracted by phase differences.

The multiplied signals can be converted into digital signals from analog signals by the AD converting circuit 155 through a magnetic sensor-output integrator circuit 175 and a magnetic sensor-output DC amplifying circuit 180.

The ring shape-arranged magnetic sensor signal calculator 115b2 of the control module 115 can calculate an amplitude and distribution of a phase difference according to existence or not and the location of a flaw by combining signals two times the number of row-directional sensors output from the magnetic sensor-output DC amplifying circuit 180.

Further, the bobbin-shaped coil sensor signal calculator 115b1 and the ring shape-arranged magnetic sensor signal calculator 115b2 can be activated after signals are input to a computing device through the coil sensor-output DC amplifying circuit 150 for amplifying two integration signals output through the coil sensor-output integrator circuit 145, the magnetic sensor-output DC amplifying circuit 180 for amplifying two integration signals for each sensor output through the magnetic sensor-output integrator circuit 175, and the AD converting circuit 155 for converting analog signals output from the magnetic sensor-output DC amplifying circuit 180 and the coil sensor-output DC amplifying circuit 150 into digital signals.

Further, a cylinder shape-arranged magnetic sensor signal calculator 115b3 selects a specific frequency of the multi-frequency AC power applier 107 and then can calculate an amplitude and distribution of phase difference according to existence or not and the location of a flaw by combining signals two times the number of row-directional sensors output from the magnetic sensor-output DC amplifying circuit 180 while sequentially selecting the arc-directional rows of the cylindrical hall sensor array 120.

The control module 115 can select a frequency of the multi-frequency AC power applier 107, change an amplification ratio of the coil sensor-output AC amplifying circuit 130 and the coil sensor-output DC amplifying circuit 150, activate the magnetic sensor power switching circuit 190, change an amplification ratio of the magnetic sensor output-parallel AC amplifying circuit 160 and the DC amplifying circuit 180, activate the AD converting circuit 155, and control the bobbin-shaped coil sensor signal calculator 115b1, the ring shape-arranged magnetic sensor signal calculator 115b2, and the cylinder shape-arranged magnetic sensor signal calculator 115b3.

FIGS. 8A and 8B are views showing a specimen with various flaws according to an embodiment of the present disclosure.

Referring to FIG. 8A, the entire length of the specimen 10 is 500 mm and there are various flaws. Further, regardless of the specimen 10, the non-flaw specimen 20 does not have the flaws of the specimen 10.

The outer diameter (OD) is 15.87, the circumferential inner diameter (ID) is 13.33, the thickness is 1.27, and the material is SS304. A TSP (Tube Support Plate) may be made of carbon steel, but the dimensions of the specimen 10 may be varied, depending on embodiments.

The flaws at the points shown in FIG. 8A are shown in FIG. 8B.

An FBH means a flat bottomed hole and a TWH means a through-wall hole. The TSP (Tube Support Plate) is also observed.

Figure 9:
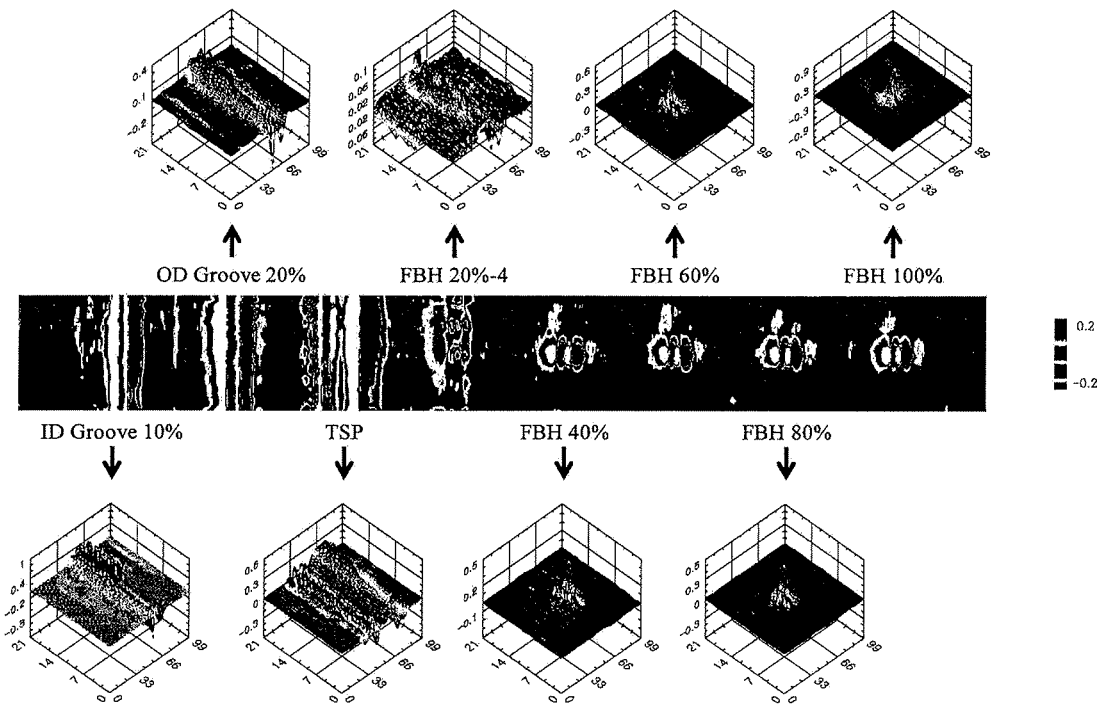
FIGS. 9 to 12 are views showing amplitude distribution and phase difference distribution of multiple frequencies using the specimen shown in FIGS. 8A and 8B.

FIG. 9 shows amplitude distribution of flaws when a frequency of 30 kHz is applied.

FIG. 9 shows distribution of a time varying magnetic field amplitude measure in one ring-shaped row selected from the cylindrical hall sensor array 120 when a frequency of 30 kHz is applied to the bobbin-shaped coil 110. The horizontal axis is a distance and the vertical axis is the location of sensors arranged at 360 degrees. In the continuous figures, all sensors react to continuous arc-directional flaws of the specimen such as an ID groove, an OD groove, and a TSP, so the magnetic field distribution is continuously changed in the vertical axial direction. FBH 20%-4 shows that four FBH flaws are arranged in a circle with gaps of 90 degrees, in which is arrangement of flaws with gaps of 90 degrees is shown through amplitude distribution. Further, FBH 40-100% shows flaws having different diameters and depths. A total of eight 3D graphs of four upper and lower graphs show distribution of the amplitude of a time varying magnetic field that can be obtained when rows arranged in a ring shape are sequentially selected with the cylindrical hall sensor array 120 at the center of the flaws. That is, it is possible to measure amplitude distribution in a specific area without mechanical operation that should accompany to obtain distribution in the related art.

Figure 10:
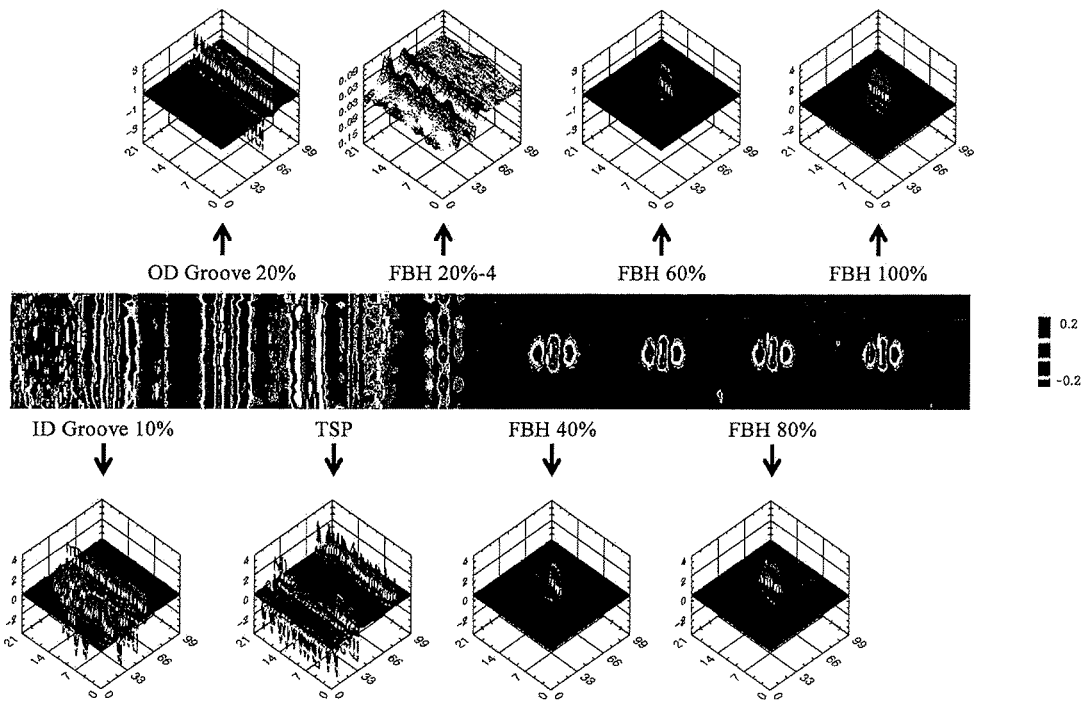

FIG. 10 shows phase difference distribution of flaws when a frequency of 30 kHz is applied.

FIG. 10 shows distribution of phase differences of a time varying magnetic field measured under the same condition as FIG. 9. The distribution is similar to FIG. 9, but the result of FBH 20%-4 is clearly different. That is, when a sensor probe is inclined to a side without maintaining a predetermined lift-off (distance between a sensor and a surface to be measured) on the inner diameter of a pipe, the strength of amplitude is changed, as shown in FIG. 9, so it is difficult to determine whether a flaw is small or the lift-off is large. However, as shown in FIG. 10, since the phase difference distribution is not largely influenced by the lift-off, flaws having the same size show the same phase difference distribution.

Figure 11:
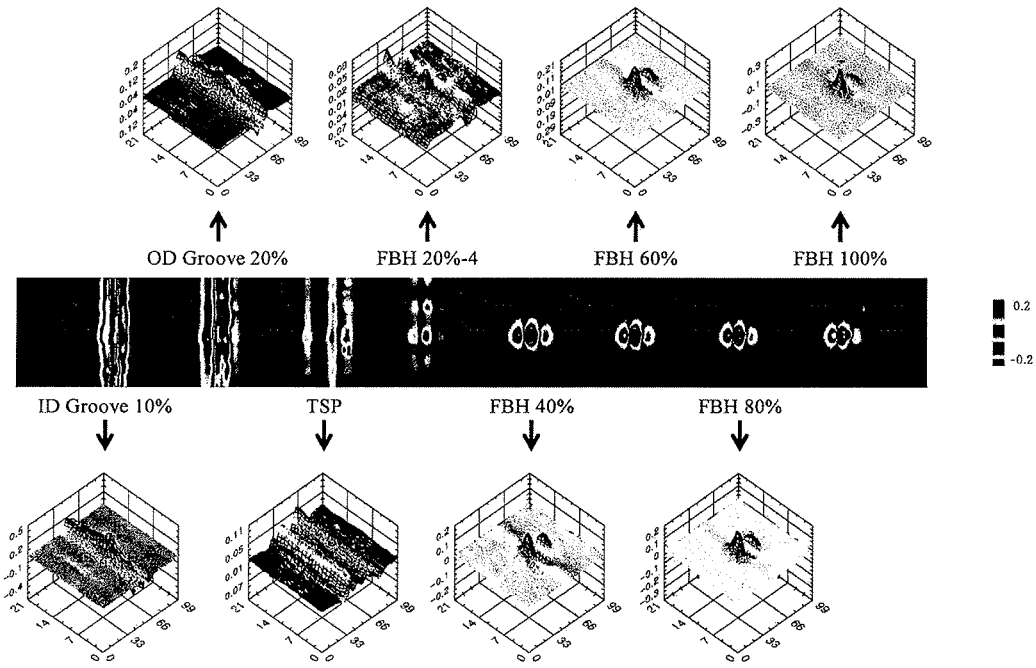

FIG. 11 shows distribution of amplitude when a frequency of 50 kHz is applied.

As the frequency is high, the permeation depth of eddy current decreases. That is, flaws close to a sensor can be easily measured, but the output of flaws far from the sensor is low. It is possible to discriminate a TSP signal on the basis of this principle. In FIG. 9, the TSP signal is very large, so a large signal is instructed in comparison to the flaws of ID groove 10% and OD groove 20%. However, when a high frequency such as 50 kHz is applied, induction current is concentrated only on the surface of the specimen 10 without reaching the TSP outside the specimen. That is, a TSP and a groove can be discriminated by using multiple frequencies as in the method of simultaneously comparing signals of 30 kHz and 50 kHz. However, according to the related art, a first method of performing scan several time while changing a frequency and a second method of slowly performing scan while changing multiple frequencies simultaneously or quickly should used to measure distribution of a time varying magnetic field while inputting several frequencies, as described above. According to the first method, the inspection time increases two times the number of frequencies, so two-times or more time and eight-times or more time are required respectively when two frequencies are input and eight frequencies are input. According to the second method, the signal processing circuit becomes complicated and expensive. However, according to the present disclosure, it is possible to observe distribution of a time varying magnetic field in a desired area by placing a sensor probe close to a flaw and performing electronic scan. That is, a user has only to change the input frequencies.

Figure 12:
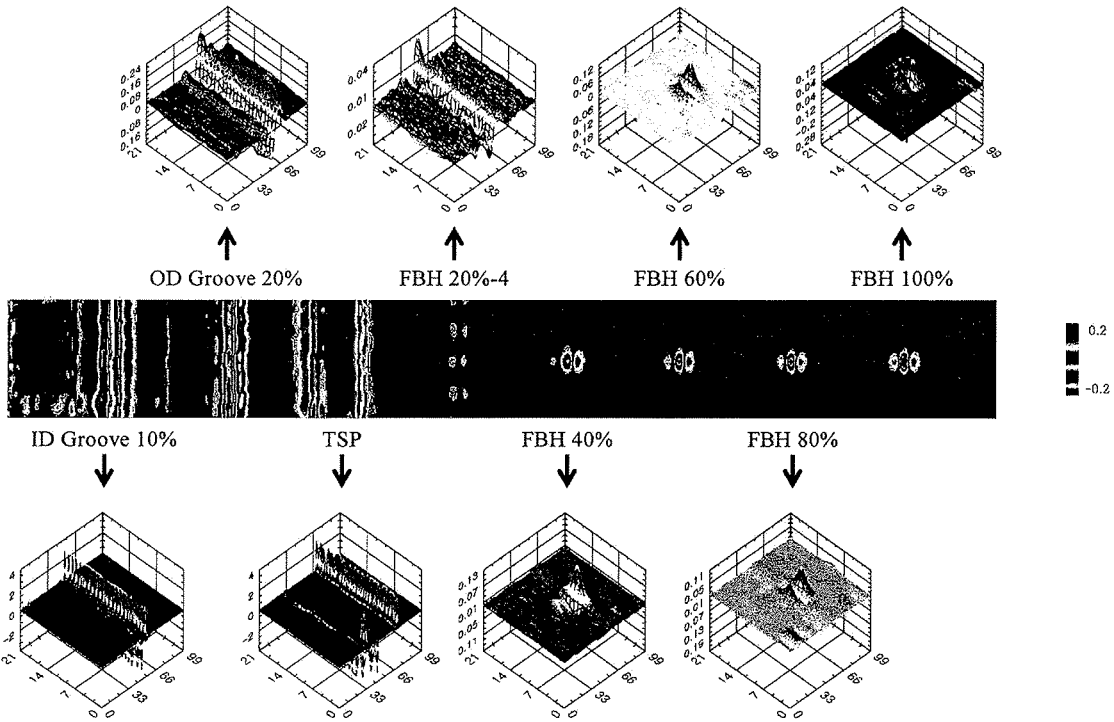

FIG. 12 shows phase difference distribution of flaws when a frequency of 50 kHz is applied.

FIG. 12 shows a phase difference distribution of a time varying magnetic field measured under the same condition as FIG. 11. Although large differences may not be shown in the graphs, it is possible to clearly see differences with reference to FIG. 13.

Figure 13:
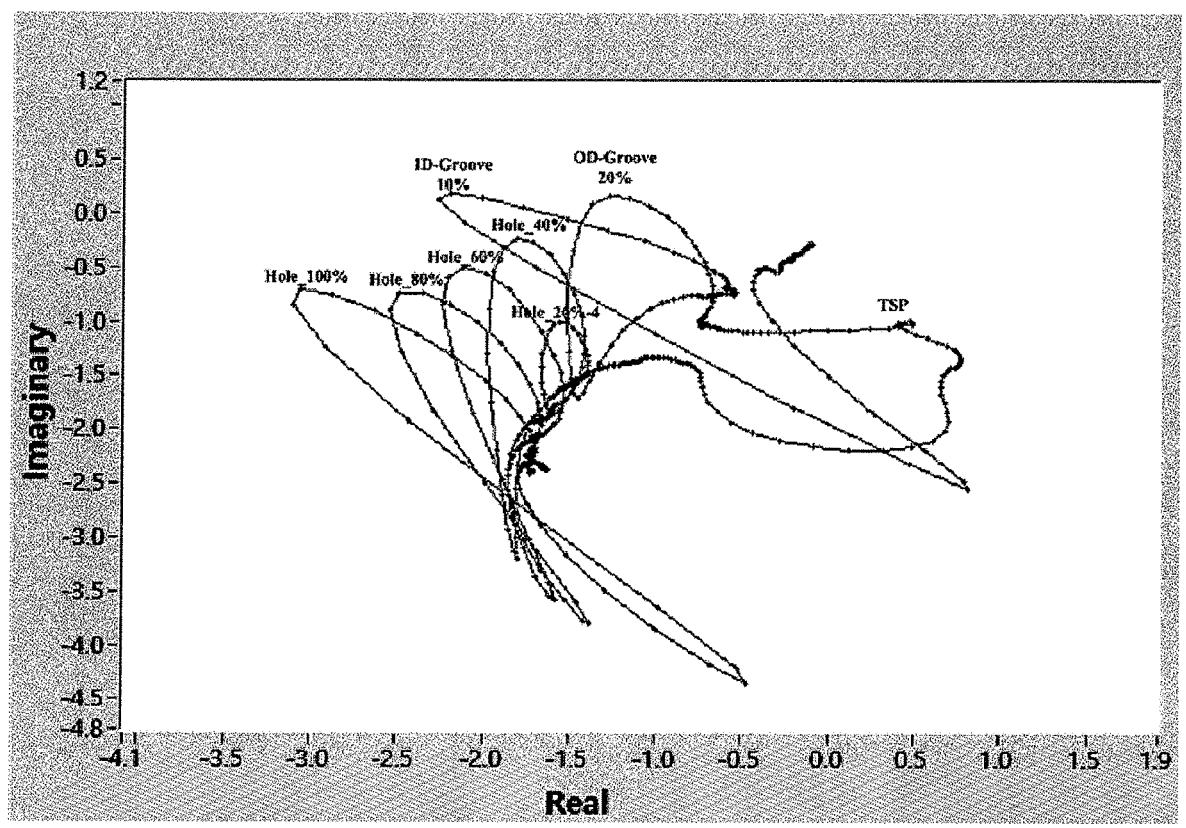
FIG. 13 is a lissajous figure based on the output of a sensor passing through the center of the flaws shown in FIGS. 11 and 12 when a frequency of 50 kHz is applied.

FIG. 13 is a lissajous figure based on the output of a sensor passing through the center of the flaws shown in FIGS. 11 and 12 when a frequency of 50 kHz is applied.

A lissajous figure is a technique that is used to determine existence or not and the location of a flaw when inspecting eddy current, in which curved patterns indicate flaws. The curved patterns are rotated counterclockwise, as the depth of a coordinate flaw become deeper from 20% to 100%. The locations and sizes of the flaw can be determined from the direction and degree of the rotation. That is, it is possible to determine that the flaws are inside or outside the specimen 10.

Referring to FIGS. 9 to 13, it is possible to measure flaws of the specimen 10 using multiple frequencies, so quantitative evaluation can be effectively performed. Further, it is possible to increase accuracy of flaw detection by scanning first a specimen using a specific frequency, and if a flaw is detected, by applying power with various frequencies when the flaw was detected.

Figure 14:
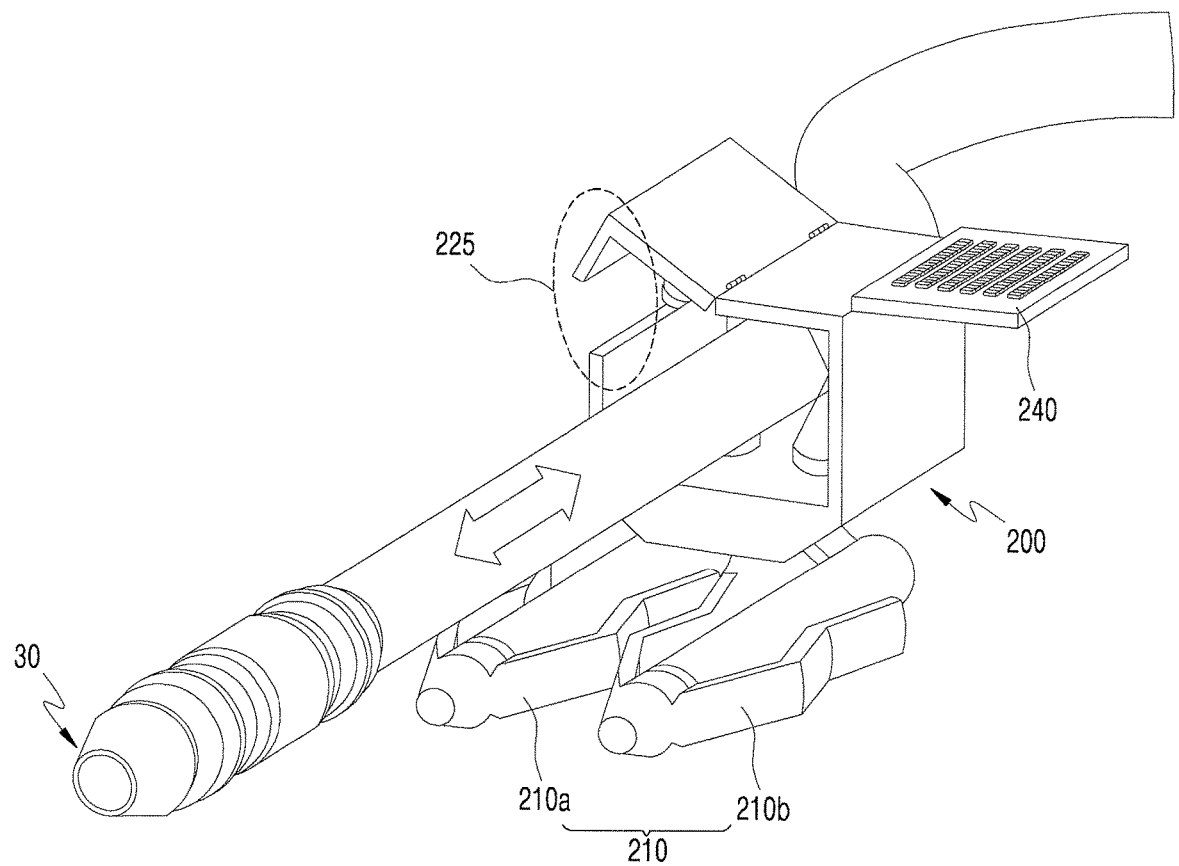
FIG. 14 is a view showing an eddy current inspection device equipped with an encoder system according to an embodiment of the present disclosure.

FIG. 14 is a view showing the eddy current inspection device 100 equipped with an encoder system 200 according to an embodiment of the present disclosure.

Referring to FIG. 14, the probe 30 can pass through the encoder system 200. To this end, the encoder system 200 has an area 225 that can be opened and closed, so the probe 30 can be easily mounted through the area.

The encoder system 200 may include a plurality of supports 210a and 210b. The supports 210a and 210b may be coupled respectively to pipes (tubes) close to the specimen 10. Accordingly, nondestructive testing can be more stably performed.

The encoder system 200 may include a display 240 that shows existence or not, the location, and the size of a flaw.

When the probe 30 is inserted into and drawn out of the specimen 10, the encoder system 200 can calculate the location and speed inside the specimen 10.

A brake (not shown) of the encoder system 200 can control the speed of the probe 30 when the probe 30 is inserted into or drawn out of the specimen. In detail, when the probe 30 is moved in the specimen 10 at a speed higher than a predetermined speed, the encoder system 200 can reduce the speed of the probe 30. Accordingly, the operation speed of the eddy current inspection device 100 can be maintained at a predetermined level when a flaw is manually detected.

The encoder system 200 can collect signals corresponding to the location of the probe 30 through an encoder. The encoder system 200 transmits the collected location information to the eddy current inspection device 100 and the eddy current inspection device 100 can display the information through the display 117.

Meanwhile, the eddy current inspection device 100 may be configured to receive power and transmit output signal through a separate signal transmission cable. The present disclosure can be achieved by computer-readable codes on a program-recorded medium. The computer-readable recording medium includes all kinds of recording devices that keep data that can be read by a computer system. For example, the computer-readable medium may be an HDD (Hard Disk Drive), an SSD (Solid State Disk), an SDD (Silicon Disk Drive), a ROM, a RAM, a CD-ROM, a magnetic tape, a floppy disk, and an optical data storage, and may also be implemented in a carrier wave type (for example, transmission using the internet). Further, the computer may include a control module 400 of a system 1000 providing contents. Therefore, the detailed descriptions should not be construed to be limited in all aspects, but should be considered to be an example. The scope of the present disclosure should be determined by rational interpretation of the appended claims, and all modifications within a range equivalent to the present disclosure should be construed as being included in the scope of the present disclosure.

What is claimed is:

1. An eddy current inspection device for nondestructive testing, the device comprising:
    a bobbin-shaped coil configured to be inserted into a specimen, which is an object of nondestructive testing, and to apply induction current to an inner diameter of the specimen;
    a reference coil configured to be inserted into a nondestructive specimen, which is a reference of the specimen, and to apply induction current to an inner diameter of the nondestructive specimen;
    a cylindrical manual sensor array configured to disposed in the bobbin-shaped coil and to include lines and rows; and
    a control module configured to select one or more frequencies of multiple frequencies, apply AC power to the bobbin-shaped coil and the reference coil, generate a square wave signal with a varying phase difference, and perform first multiplication by an applied signal and the square wave signal,
    wherein the control module is configured to switch and apply driving power such that arc-directional rows are sequentially selected from a plurality of rows of the cylindrical manual sensor array, and to perform second multiplication of multiplying the applied signal by the square wave signal with a varying phase frequency, and
    configured to detect a flaw of the specimen on the basis of the first multiplied signal and the second multiplied signal, using amplitude and phase difference distribution of a signal.

2. An eddy current inspection device for nondestructive testing, the device comprising:
    a bobbin-shaped coil configured to be inserted into a specimen, which is an object of nondestructive testing, and to apply induction current to an inner diameter of the specimen;
    a cylindrical manual sensor array configured to disposed in the bobbin-shaped coil and to include lines and rows; and
    a control module configured to select one or more frequencies of multiple frequencies, apply AC power to the bobbin-shaped coil, generate a square wave signal with a varying phase difference, and perform first multiplication by an applied signal and the square wave signal,
    wherein the control module is configured to switch and apply driving power such that arc-directional rows are sequentially selected from a plurality of rows of the cylindrical manual sensor array, and to perform second multiplication of multiplying the applied signal by the square wave signal with a varying phase frequency, and
    configured to detect a flaw of the specimen on the basis of the first multiplied signal and the second multiplied signal, using amplitude and phase difference distribution of a signal.

3. An eddy current inspection device for nondestructive testing, the device comprising:
    a bobbin-shaped coil configured to be inserted into a specimen, which is an object of nondestructive testing, and to apply induction current to an inner diameter of the specimen;
    a reference coil configured to be inserted into a nondestructive specimen, which is a reference of the specimen, and to apply induction current to an inner diameter of the nondestructive specimen;
    a ring-shaped manual sensor array configured to disposed in the bobbin-shaped coil and to include one row; and
    a control module configured to select one or more frequencies of multiple frequencies, apply AC power to the bobbin-shaped coil and the reference coil, generate a square wave signal with a varying phase difference, and perform first multiplication by an applied signal and the square wave signal,
    wherein the control module is configured to apply driving power to the ring-shaped manual sensor array and to perform second multiplication of multiplying the applied signal by the square wave signal with a varying phase frequency, and
    configured to detect a flaw of the specimen on the basis of the first multiplied signal and the second multiplied signal, using amplitude and phase difference distribution of a signal.

4. The device of claim 1, further comprising an encoder system,
    wherein the encoder system includes:
    a support configured to be temporarily inserted in a tube placed at a predetermined distance to the specimen that is an object of nondestructive testing;
    a brake configured to control a movement speed of a probe of the eddy current inspection device when the probe is inserted into or drawn out of the specimen and a predetermined condition is satisfied; and
    an encoder configured to output a signal corresponding to the location of the probe in the specimen when the probe is inserted into or drawn out of the specimen.

5. The device of claim 4, wherein the encoder system is configured to reduce the movement speed of the probe through the brake when the probe is inserted into or drawn out of the specimen at a speed higher than a predetermined speed.

6. The device of claim 1, wherein the phase difference of the square wave signal with a varying phase difference is 90 degrees.

7. The device of claim 1, further comprising a display,
    wherein the control module is configured to quantitatively display amplitude and a phase difference of the signal for each flaw on the display on the basis of one or more selected frequencies.

8. The device of claim 1, wherein the control module is configured to activate a circuit configured to determine an amplification ratio of an AC amplifying circuit and a DC amplifying circuit, switch and apply driving power to the lines and rows of the cylindrical manual sensor array, and convert an analog signal into a digital signal.

* * * * *